Aug. 14, 1945.   H. C. MARKS   2,382,734
ELECTRICAL DETERMINATION OR CONTROL OF CHLORINE IN LIQUIDS
Filed Dec. 28, 1940
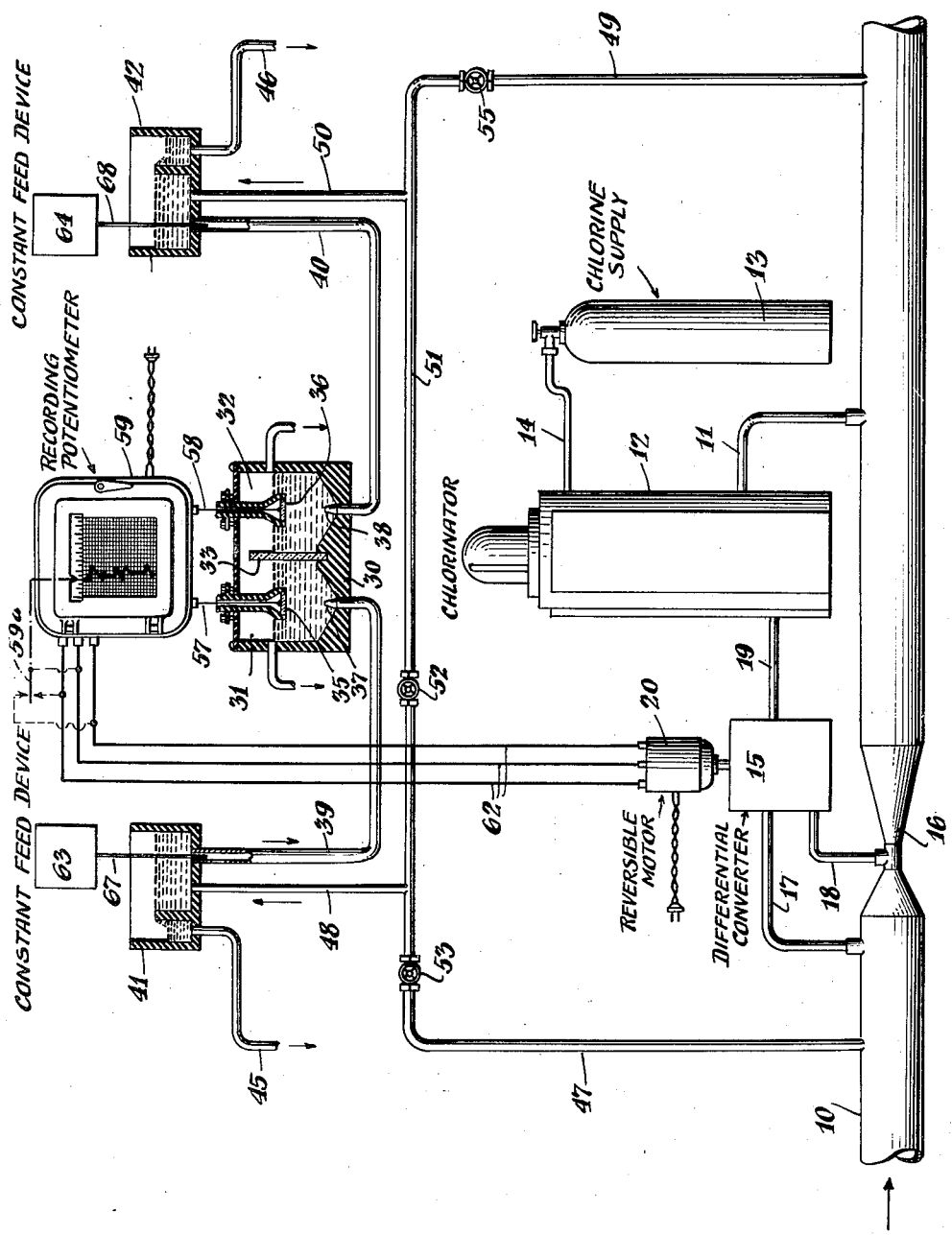
INVENTOR
Henry C. Marks
BY
Cooper, Kerr & Dunham
ATTORNEYS Patented Aug. 14, 1945

2,382,734

UNITED STATES PATENT OFFICE 2,382,734

ELECTRICAL DETERMINATION OR CONTROL OF CHLORINE IN LIQUIDS

Henry Clay Marks, Bloomfield, N. J., assignor to Wallace & Tiernan Products, Inc., Belleville, N. J., a corporation of New Jersey Application December 28, 1940, Serial No. 372,208

4 Claims. (Cl. 204—1)

This invention relates to the electrical determination or control of the amount of chlorine in an aqueous liquid, for indicating or recording the quantity or the changes in quantity, or for controlling the quantity, of chlorine in an aqueous liquid medium, such as water, sewage or other liquid which may have been treated with chlorine.

One object of the invention is to provide more accurate and more reliable methods and apparatus of the character described, and especially to reduce or minimize undesirable effects such as have often heretofore been encountered in the use of cells or electrodes for electrically detecting the content of substances of the class stated, in liquids.

Another and notably important object of the invention is to provide an improved system or procedure for the control or indication of the treatment of a material whereby substantially constant and reproducible results are obtained.

An additional object is to provide methods whereby previously known apparatus and procedures may be improved and their use simplified or made more reliable in the control and measurement of conditions for which such previous systems have involved difficulty or special adaptation or expense.

Further objects include such as are hereinafter stated or apparent in the description, drawing or claims hereof, and such as are incidental to the use or practice of the methods of the invention herein disclosed.

One example of a class of previously known methods for electrically detecting chemical conditions of the character described may be identified as comprising the potential-responsive types of systems. Thus it is known that an oxidizing or reducing agent in a liquid medium confers on an electrode dipping into it an electrical potential and that such potential should be susceptible of correlation in a definite and predictable manner with the concentration of the oxidizing or reducing substance. Careful tests have indicated that in general, in order to achieve a relationship which is constant and reproducible and at the same time to obtain optimum life and accuracy of the system it is preferable that the two following conditions be substantially fulfilled:

(1) The electrode material should be chemically inert to the oxidizing and/or reducing substance being measured.

(2) The oxidizing and/or reducing substance should be in thermodynamic reversible equilibrium with the surrounding medium and with the electrode.

By the state of reversible equilibrium specified in requirement (2), I mean such condition that if the electrical potential produced by the oxidizing substance is opposed by a slightly smaller potential and is allowed to cause a small amount of current to flow and if then the opposing potential is made slightly larger so that the same amount of current is caused to flow in the opposite direction, the system will return exactly to its initial state. In other words, if upon disturbing the electro-chemical equilibrium in one direction it is thereafter similarly disturbed in the opposite direction, the original equilibrium will be re-established and the chemical or electro-chemical relations between the oxidizing substance and its containing medium and the electrode will be the same as before.

In most cases, the oxidizing or reducing substances detectable with superior accuracy by electrode potential methods are those which are ionic in nature; examples of oxidizing and reducing substances which are ionic and are electromotively active in the desired fashion (to yield well defined potentials), are ferric salts, ferrous salts, ferricyanides, ferrocyanides, cupric salts, cuprous salts.

It will now be understood by those skilled in the art that the satisfaction or substantial satisfaction of each of the two foregoing conditions, and likewise the existence of the desired characteristic of electromotive activity in the substance or substances under consideration, may be readily determined for any given system or set-up of substances and electrode, by known and recognized methods; attention being directed, for example, to "Thermodynamics and Free Energy of Chemical Substances" by Lewis and Randall (McGraw-Hill, New York).

As stated, an important aspect of the invention relates to the indication or control of chlorine or the like in connection with the treatment of water or sewage, and hence by way of example the invention is conveniently illustrated by embodiments involving chlorine control and indication in systems of the stated character.

It has been found that chlorine in water or sewage at pH values ordinarily encountered appears to exist chiefly in the form of hypochlorous acid or chloramines, which generally fall short of the preferred fulfillment of condition (2) hereinabove, and in addition, probably no electrode has yet been devised (or at least, so far as I am aware, is any such available) which meets completely condition (1) for hypochlorous acid or chloramines. However, tests have revealed that chlorine gas dissolved in a strongly acid solution at relatively high concentrations, is electromotively active and fulfills both conditions sufficiently, so as to yield definite, predictable potentials with rare metal electrodes and to afford superior results with a potential-responsive system. In solutions of this type the chlorine does not seem to exist in the form of hypochlorous acid or chloramines to any appreciable extent.

Broadly stated, an important feature of the present invention involves the addition, to a known volume of the medium under test, of a predetermined amount of a reducing agent. In the case of a medium treated by chlorine a reducing agent is advantageously added in excess so that any chlorine or chloramine present will be used up completely in oxidizing part of the reducing agent and thus give a mixture of reductant and oxidant. As the method of testing depends on the establishment of an electrode potential (originated by an electromotively active oxidizing agent), the reducing agent should preferably be part of an oxidation-reduction system which fulfills conditions (1) and (2) stated hereinabove. Then an electrode immersed in the medium will take on a definite, reproducible potential which depends on the ratio of oxidant to reductant and therefore varies with the chlorine concentration.

By way of example, a certain presently preferred form of apparatus embodying the invention and adapted to carry out the procedure thereof, is shown in the accompanying drawing, wherein the single figure is a view, chiefly diagrammatic, of an electrode potential system embodying the invention.

While the invention is susceptible of use in other combinations and environments, it is particularly adaptable to systems for controlling or indicating the composition of a liquid. Accordingly, the system shown in the drawing is hereinafter described as applied to the detection and determination, for example, of the chlorine concentration of water, sewage or other liquid which may be contained in or flowing through or from a system involving treatment by the application of chlorine or chlorine-liberating materials.

Referring to the drawing, the liquid to be tested or controlled may, for instance, consist of water flowing through a conduit 10 to which chlorine is subsequently added, in predetermined or determinable amount, through the conduit 11 by means of a chlorine feeding device 12 which may, for example, be of the type described in United States Patent No. 1,777,987, issued October 7, 1930 to Charles F. Wallace. It will be understood that a supply of chlorine gas under pressure is contained in the cylinder 13 and fed to the chlorinator 12 through the pipe or tubing 14.

In ordinary cases, the flow of liquid through the conduit 10 may vary, for instance in accordance with the consumption or the requirements of use, and it is usually desirable to maintain at least a certain degree of proportionality between the flow of chlorine gas or solution through the pipe 11 and the flow of liquid through the conduit 10. For purposes of illustration a suitable device to accomplish such proportionality may be a differential converter generally designated 15, such as described in United States Patent No. 1,762,706, issued June 10, 1930 to Charles F. Wallace. The differential converter 15 is operated by a Venturi meter 16 which creates a pressure differential that is conveyed to pressure sensitive elements (not shown) in the converter 15 by means of suitable pipes 17 and 18. As will be apparent from the cited Patent No. 1,762,706, the converter 15 produces a controlling vacuum which varies in accordance with variations in flow through the main 10, and which is transmitted to the vacuum type chlorinator 12, for control thereof, by means of the pipe 19.

The apparatus of the cited Patent No. 1,762,706 includes adjusting means for varying the ratio between the supply of chlorine and the rate of flow of the water or the like to which the chlorine is added; such adjusting means comprising, for instance, the adjustable orifice 26 shown in Figs. 1 and 5 of the patent. Where the present invention is to be employed for automatically regulating the feed of chlorine to maintain a substantially constant or predetermined condition in the water treated, suitable means such as the reversible motor 20 may be provided to effect the desired adjustment, as by operating the stated adjustable orifice of the differential converter 15. Although other arrangements may be employed whereby a device such as the motor 20 is adapted to adjust the rate of chlorine supply or the ratio between such rate and the rate of flow of water (for example where Pitot tubes as in Fig. 6 of the patent are used instead of a venturi, the pressure differential may be too small for feasible use of an adjustable orifice, and the motor may then be arranged to adjust the position of fulcrum 17 in Fig. 6 of the cited patent, or to adjust a valve in the chlorinator such as the valve 140 in Fig. 2 of the other cited Patent No. 1,777,987), the adjustment of the orifice in the converter apparatus shown is a convenient arrangement and is therefore specifically described for purposes of illustration.

For detection of the electrode potential occasioned by treatment of the water in the main 10 with chlorine, the system may include a double electrode cell 30, preferably comprising a pair of chambers 31, 32 separated by a porous partition 33. Each chamber of the cell has disposed within it an electrode comprising a downwardly facing disk of rare metal, for instance of gold or platinum, the electrode disks of the chambers 31, 32 being thus respectively designated 35, 36. In all other respects each of the two chambers of the cell may be similar in construction and arrangement to the cell disclosed in the pending application of Charles F. Wallace, Serial No. 290,841, filed August 18, 1939. As will be apparent from the disclosure of the cited application, each chamber or cell portion includes a nozzle or Venturi device (generally designated 37, 38 in chambers 31, 32) whereby the flow of liquid is continually introduced into the chamber or cell and causes abrasive particles to be projected against the electrode surface. The abrasive particles are entrained in the projected jets of liquid, and returned in a circulatory fashion to the bottom of the cell, for cleaning the exposed surface of the electrodes and maintaining the same in proper operating condition, all as more fully disclosed and explained in the cited application.

The nozzles 37, 38 of the cell are respectively supplied with liquid under a constant head through pipes 39, 40, from corresponding constant level boxes 41, 42; the constant level boxes having suitable provisions for overflow of waste through the conduits 45, 46 as shown. Untreated water is supplied to the box 41 from the main 10 by pipes 47, 48, the former being connected to the main 10 at a point upstream of the pipe 11. Treated water is similarly supplied to the box 42 through pipes 49, 50, pipe 49 being connected to the main 10 at a point downstream of the pipe 11.

For purposes hereinafter described, the pipe systems 47, 48 and 49, 50 are connected by an intermediate pipe or conduit 51 which is provided with a valve 52; and valves 53, 55 are provided respectively in the pipes 47, 49, i. e. at points intermediate the water main 10 and the junctions of the piping systems with the connecting conduit 51. It may now be explained that when the valve 52 is closed and valves 53, 55 are open, as is intended for normal operation of the system, untreated water is supplied under pressure from the main 10 to the constant level box 41 and thence at a constant rate to the left hand compartment 31 of the cell 30, and similarly a sampling of the treated or chlorinated water is continuously supplied under pressure from the main to the box 42 and thence at a constant rate to the right hand compartment 32 of the cell. For calibrating the cell and systems when desired, a convenient procedure is to supply untreated water to both sides of the cell, and such operation may be readily effected by closing the valve 55 and opening the valves 53 and 52. Then, for normal control or indicating operation after completion of calibration, the valve 52 may be closed and valve 55 opened (valve 53 also being open), for supply of treated and untreated water in the manner described herein above.

Although the invention is applicable to a variety of electrically controlled systems, including potential-responsive arrangements such as that of United States Patent No. 2,076,964 issued April 13, 1937 to Richard Pomeroy, the system illustrated in the drawing fundamentally embodies the arrangement of United States Patent No. 1,944,803 issued January 23, 1934 to Georg Ornstein, in that one electrode is subjected to untreated liquid, another electrode is subjected to the liquid after treatment, and the voltage developed across the electrodes is employed to indicate change in composition of the treated liquid and also preferably to control the treating apparatus.

In the arrangement shown in the drawing, the conductors 57, 58 from the electrodes of cell 30 extend to a suitable translating device generally designated 59, which is conveniently arranged to control the motor 20 in such fashion that when the voltage between the electrodes 35 and 36 varies in one direction the motor operates to reduce the ratio of chlorine supply to water flow, and when the voltage between the electrodes varies in the opposite direction, the motor operates to give an increase in the relative rate of chlorine supply. As will now be appreciated by those skilled in the art, anyone of a variety of sensitive voltage-responsive devices and circuits may be employed for controlling the motor 20 in accordance with changes of voltage between the conductors 57, 58; for example, the device 59 may be a conventional recording potentiometer, as shown, having the usual contact arrangements 59a for starting and stopping the motor in either direction, by control of circuits, including the three conductors 62, between the meter 59 and the motor. Although in some instances the rate of chlorine flow to the liquid under treatment may be controlled solely by the electrical detection of changes in the composition of the treated liquid, the illustrated system is such that the cell 30 and its associated instrumentalities serve as a trimmer on the automatic flow proportioning apparatus, (e. g. the converter 15) which controls the flow of chlorine in proportion to the volume of water passing the point of application.

In accordance with the present invention the system also includes constant feed devices 63, 64, which may, for example, be of the type disclosed in the United States Patent No. 1,593,109 issued July 20, 1926, to Charles F. Wallace. These devices are conveniently adapted to feed a reducing agent of known concentration, e. g. in solution, through the pipes 67 and 68, respectively, into the corresponding conduits 39, 40, which feed the untreated and treated water to the two compartments of the cell 30. In this fashion, the reducing agent is added at a constant rate to the liquid under test, which themselves are fed to the cell at a constant rate, thus maintaining a predetermined quantity of the reducing agent in each side of the cell, with respect to the quantity of liquid under test therein. It will be understood that other types of feeding devices adapted to deliver reagent at a constant predetermined rate may be employed instead of those of the cited Wallace Patent No. 1,593,109; for instance, satisfactory results may be had with one or another of the devices shown in Figs. 3 to 5, inclusive of the pending application, Serial No. 350,712 of Charles F. Wallace, filed August 3, 1940.

A considerable variety of reducing agents may be employed and as will now be readily appreciated by those skilled in the art, the specific reagent selected may depend on the specific conditions under which the system is to function in actual practice. Among others, particularly satisfactory reducing agents are o-tolidine, hydroquinone and potassium ferrocyanide, and likewise other ferrocyanides such as those of sodium, barium and the like. Other useful reducing agents include ferrous chloride, ferrous sulfate, cuprous salts, and organic derivatives that have oxidization potentials in the same range as hydroquinone. The re-agent may be dissolved in water, alcohol, or other suitable solvents, depending upon the material being tested or controlled. Although in some cases the re-agent may take the form of a filter bed through which an auxiliary stream of liquid is passed to be saturated with the re-agent and then fed by suitable feeding devices, satisfactory results are obtainable with apparatus such as the devices 63 and 64 which directly handle a pre-established solution of the chemical.

Among the re-agents named, potassium ferrocyanide is at present greatly preferred; it appears that re-agents such as o-tolidine, ferrous salts and other inorganic substances as mentioned hereinabove are somewhat less advantageous in that they fulfill the required conditions only in acid solutions. Ordinarily, such requirement involves the simultaneously feeding of an acid, and furthermore when the medium under test is made acid, iron and manganese compounds initially present in it may affect the electrode potential. Tests have also indicated that the potentials of many substances are affected by pH changes, so that if the pH of the liquid being tested is subject to much variation, either a buffer must be added with the re-agent, or unchlorinated water to which the re-agent is fed must be used as the reference electrode (i. e. as in the system illustrated in Fig. 1, rather than in a system such as that of the above cited Pomeroy Patent No. 2,076,964 wherein a standard half cell is used as the reference electrode). In any event, it has been found that the potential of the ferrocyanide system is not effected by pH changes within the ordinary range encountered, e. g. in the treatment of water, sewage and the like. It is somewhat effected by large changes in salt concentration, but according to past experience, large changes of that character are not ordinarily encountered in practice. Some of the re-agents, for example ferrous salts, o-tolidine, potassium iodide, re-act with chloramines with sufficient rapidity so that cells with which they are used may indicate chloramines as well as free hypochlorous acid. In addition, such of these substances as may be readily used at pH values above 5 do not re-act with iron and manganese in such manner as to produce false readings.

The operation of a system such as that shown in the drawing in actual practice will now be readily understood. At the outset, for example, the indicating and control instrumentalities, including the potentiometer 59, may be calibrated to an appropriate point corresponding to the absence of oxidizing agent in the treated liquid, by subjecting both sides of the cell 30 to untreated liquid in the manner hereinabove explained. Thereupon the valve 52 is closed and with valves 53 and 55 both open, the system can be operated to detect the concentration of oxidizing agent in the treated liquid and to control the rate of chlorine flow accordingly. Preferably, as stated, the arrangement is such that when the potential difference between the electrodes 35 and 36 varies substantially from a predetermined point or optimum range, the motor 20 is operated in an appropriate direction to change the rate of chlorine supply (more specifically in this instance, the ratio between chlorine supply and flow of water in the main) so as to restore the condition of the treated liquid to the desired point or range. In this manner, excess application of chlorine is avoided and at the same time the control instrumentalities automatically insure the application of sufficient chlorine to perform its intended task in the medium under treatment. In accordance with the principles of the present invention as now understood, the addition of the reducing agent in constant predetermined quantity relative to the quantity of the media under test in the cell 30, and the action of the reducing agent as previously set forth, cooperate to afford the production of accurate and truly representative potentials at the electrodes 35, 36, in the manner explained hereinabove, and specifically serving to prevent such deleterious effects as may be occasioned by chemical action on the electrodes, and also serving to insure the desired condition of reversible equilibrium particularly in the treated medium to which electrode 36 is subjected. It will also be noted that since both halves of the cell 30 are supplied with the same quantity of reducing agent, any inter-action between such agent and other substances in the medium (i. e. other than the oxidizing agent) is balanced out, and changes in potential between the conductors 57 and 58 are truly representative of changes in the content or concentration of the oxidizing agent in the treated liquid as sampled.

As previously explained, the procedure of the invention may be carried out with a variety of apparatus and may be embodied in various systems for electrical detection of the chemical composition of liquids. Thus, for example, instead of the type of cell shown in the figure, cells and systems more specifically illustrated in the cited Ornstein Patent No. 1,944,803 may be used; or likewise, cells and systems more specifically of the character shown in the pending application of Charles F. Wallace, Serial No. 263,660, filed March 23, 1939. In cases where the cells embody portions respectively supplied with untreated and treated water, the same amount of reducing agent is fed to both sides (as explained hereinabove in connection with the figure, and the difference in potential between the electrodes may be taken to indicate or control the degree of chlorination. Likewise, as previously stated, the invention may be applied to systems of the type shown in the cited Pomeroy Patent No. 2,076,964 and modifications thereof or improvements thereon; in such cases it is ordinarily desirable that the reagent be a ferro-cyanide or the like, or that a buffer be added with the reagent to keep the pH constant.

It will be understood that the procedure and systems of the invention may be applied for purposes of indication or control or both, and although illustration has been set forth of a preferred embodiment wherein the liquid is tested continuously and the reagent fed continuously, the procedure is beneficially applicable to individual or discontinuous tests. For instance, samples of the medium to be tested may be taken discontinuously and to each sample there may be added a quantity of the reagent in a definite predetermined amount. As will be readily appreciated, the accuracy of indication and the accurate correlation of successive readings is dependent on quantitative accuracy of feed of the reducing agent, e. g., in all samples to be compared (whether taken continuously or discontinuously) the concentration of reagent in the medium, as incorporated, should be uniform. As stated, the procedure and systems of the invention are applicable to a wide variety of uses, not only in water and sewage treatment, but also, for instance in other fields.

In accordance with the provisions of the patent statutes, I have herein described the principles of operation of my invention, together with procedures which I now consider to represent the best embodiments thereof, but I desire to have it understood that the procedures disclosed are only illustrative and that the invention can be carried out in other ways. Also, while it is designed to use the various features and elements in the combinations and relations described, some of them may be altered and others omitted and some of the features of each modification may be embodied in the others without interfering with the more general results outlined, and the invention extends to such use within the scope of the appended claims.

It will be understood that where reference is made in the claims to a test or other examination for chlorine content of a liquid, the terminology is intended to include various forms of "available" chlorine, e. g. chloramines, or hypochlorous acid, and is unrestricted as to the original chlorinating treatment, whether by addition of chlorine per se or otherwise, for example as hypochlorite; and similar understanding is intended for respect to references to the halogens more generally.

I claim:

1. The method of continuously determining the concentration of available chlorine in an aqueous liquid, which comprises the steps of passing such a liquid continuously through a potential measuring system at a predetermined rate, continuously and at a predetermined rate adding to the liquid prior to its introduction into such system a predetermined amount of a reducing agent, so that the reducing agent will be present in a known concentration which is stoichiometrically in excess of the amount of the available chlorine to be determined; said reducing agent being of such kind as will react with and completely reduce all the available chlorine present in the liquid to form an oxidation-reducing system which is thermo-dynamically reversible, and measuring the oxidation-reduction potential of the system thus formed as indicative of the amount of available chlorine present in the liquid.

2. The method in accordance with claim 1, wherein the reducing agent is potassium ferrocyanide.

3. The method in accordance with claim 1, wherein the reducing agent is hydroquinone.

4. The method in accordance with claim 1, wherein the reducing agent is o-tolidine.

HENRY CLAY MARKS.